United States Patent Office 3,546,266
Patented Dec. 8, 1970

3,546,266
PROCESS FOR THE PREPARATION OF AN ORGANIC SILICON COMPOUND BY REACTING IN THE PRESENCE OF A RHODIUM CATALYST
Robert Stevenson Coffey, Norton-on-Tees, England, assignor to Imperial Chemical Industries Limited, London, England, a corporation of Great Britain
No Drawing. Filed Aug. 18, 1966, Ser. No. 573,174
Claims priority, application Great Britain, Sept. 3, 1965, 37,692/65
Int. Cl. C07f 7/08, 7/18
U.S. Cl. 260—448.25         7 Claims

ABSTRACT OF THE DISCLOSURE

A process is provided for the preparation of an organic silicon compound, which process comprises reacting a compound containing at least one silicon to hydrogen bond with a compound containing at least one unsaturated bond in the presence of a rhodium catalyst of the formula $RhX(R'R''R''')Y)_3$ where X is an anionic element and the R's are organic groups and Y is arsenic, antimony or phosphorus.

---

The invention relates to the production of organic silicon compounds, particularly to the production of organic silicon compounds from a silane and a compound containing an olefinic or acetlyenic bond.

Silicones, which are an important group of compounds widely used in industry, may be prepared by polymerization of suitable intermediates, particularly organochlorosilanes. The organochlorosilanes may be prepared in a variety of structures by the reaction of compounds containing silicon to hydrogen bonds, such as $HSiCl_3$ or $CH_3SiHCl_2$ with a compound containing an olefinic or acetylenic bond:

$$CH_2=CH_2+HSiCl_3 \rightarrow CH_3CH_2SiCl_3$$
$$CH\equiv CH+HSiCl_3 \rightarrow CH_2=CHSiCl_3$$
$$CH_2=CHSiCl_3+HSiCl_3 \rightarrow Cl_3SiCH_2CH_2SiCl_3$$

Such reactions may be effected at an elevated temperature, or may be carried out at lower temperatures using catalysts such as ultraviolet light, organic peroxides and platinum (on charcoal or asbestos). The present invention provides an improved catalyst for such a reaction which may be used at ambient temperature.

According to the invention a compound containing at least one silicon to hydrogen bond is contacted with a compound containing at least one acetylenic or olefinic bond, in the presence of a catalyst of general formula $RhX (R'R''R''')Y)_3$ where: Rh is rhodium, X is an anionic element or group, R', R'' and R''' are organic groups and Y is arsenic, antimony or phosphorus.

The compound containing at least one silicon to hydrogen bond has the formula:

in which the residual valencies may be satisfied by any suitable element or group which is inert to the catalyst or the compound containing the acetylenic or olefinic bond. Hydrocarbon groups may be used to satisfy the residual valencies, particularly alkyl groups, e.g. methyl, ethyl, propyl, and butyl groups, cycloalkyl groups, e.g. cyclohexyl groups, alkenyl, e.g. vinyl or allyl groups, and aryl e.g. phenyl or substituted phenyl groups. The hydrocarbon group may also be substituted with functional groups such as fluorine, e.g. the trifluoromethyl group, or ester groups.

An important means by which the residual valencies may be satisfied is through an oxygen atom. Thus alkoxy, e.g. ethoxy, or aryloxy groups may be attached to the silicon atom. When the oxygen is linked to another silicon atom as in

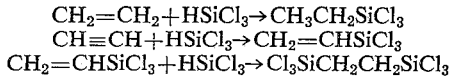

a particularly useful group of reactants in the process, the siloxanes, are obtained.

The residual valencies may be satisfied by the same or different elements or groups. Thus compounds such as methyl phenyl vinyl silane, diphenyl silane and symmetrical tetramethyl disiloxane are suitable reactants in the process.

The compound containing an olefinic bond may be an olefine, particularly an olefine having up to twenty carbon atoms, e.g. ethylene, propylene, hexenes, octenes or nonenes, or a diolefine, e.g. butadiene. The olefinic bond may be in the terminal or non-terminal position, but the terminal position is preferred. The compound containing an olefinic bond may also include functional atoms or groups such as nitrile, ester, e.g. vinyl or allyl acetate, ether, e.g. a vinyl ether, a silicon atom, e.g. vinyl triethoxysilane, amide, epoxide or urethane.

The compound containing an acetylenic bond may be acetylene itself or a homologue of, or a substituted, acetylene. When such a compound is used in the process, the group to which it gives rise on the silicon atom contains an olefinic double bond; for example, acetylene gives rise to the vinyl group.

In some cases the compound containing a silicon to hydrogen bond and the compound containing an acetylenic or olefinic bond may be the same compound, in which case the reaction product is a polymeric material. If the molecule has only one silicon to hydrogen bond and one olefinic or acetylenic bond a linear or cyclic polymer is formed. Examples of suitable silanes for this purpose are dimethyl vinyl silane, allyl diphenyl silane and methylphenyl vinyl silane.

The anionic element or group X in the catalyst of formula $RhX (R'R''R''')Y)_3$ may be cyanide, cyanate, thiocyanate or carboxylate such as acetate. Preferably the anionic element is halogen, more preferably chlorine, bromine or iodine.

The organic groups R', R'' and R''', which may be the same or different, may be a hydrocarbon group such as alkyl, cycloalkyl, aryl, alkaryl, aralkyl, alkenyl or cycloalkenyl or a substituted hydrocarbon group, particularly alkoxy or aryloxy. Preferably the organic group is an alkyl group, particularly a lower alkyl group having 1 to 6 carbon atoms, e.g. ethyl, or an aryl group, e.g. phenyl, or an aralkyl or alkaryl group, e.g. a tolyl, xylyl or benzyl group.

The catalyst, which may for example be $RhCl (Ph_3P)_3$, $RhCl([PhO]_3P)_3$ or $Rh(SnCl_3) (Ph_3P_3)$, may be used in a concentration of $10^{-8}$ to $10^{-2}$ molar, particularly $10^{-6}$ to $10^{-2}$ molar.

The process is usually carried out at ambient temperature, but if desired an elevated temperature may be used, for example up to 300° C.

The process may be conveniently carried out using either the compound containing the silicon to hydrogen bond or the compound containing the olefinic or acetylenic bond as solvent when either one or the other is liquid under the conditions of thep rocess. Alternatively an inert solvent such as an aromatic hydrocarbon, e.g. benzene, or an ether, e.g. diethyl ether, may be used.

The process may be carried out at atmospheric pressure for liquid reactants or, if one or both of the reactants are gaseous, an elevated pressure may be employed. A suitable elevated pressure is up to 10 atmospheres.

The products of the process are useful as intermediates in the manufacture of silicones.

The invention will now be further described and illustrated by reference to the following examples.

EXAMPLE 1

1 cc. of $5 \times 10^{-3}$ moles per litre solution of

[RhCl(Ph$_3$P)$_3$]

in benzene was added to a mixture of 1.84 grams of Ph$_2$SiH$_2$ and 2.3 grams of octene-1 at room temperature under nitrogen. After 12 minutes the mixture went hot. The light ends were removed by distillation under reduced pressure and the residue was shown to contain diphenyloctylsilane by molecular weight measurements by mass spectrometry.

EXAMPLE 2

10 ccs. of a $1 \times 10^{-3}$ moles per litre solution of [RhCl(Ph$_3$P)$_3$] and PhMe(CH$_2$=CH)SiH (1.507 g.) in benzene was allowed to stand at room temperature. After standing overnight the volatile material was removed by distillation and mass spectral analysis and U.V. spectra of the residue showed that dimers and higher polymers of the silane had been formed.

EXAMPLE 3 n-Tetradecene (196 g., 1.0 mole) and [RhCl(Ph$_3$P)$_3$] (559.3 mg., $6 \times 10^{-4}$ moles) were dissolved in dry benzene (1000 mls.), and triethoxysilane (220 g., 1.34 mole) was added slowly, with stirring, at room temperature. The golden-coloured solution was boiled under reflux for 2 hr., after which benzene and triethoxysilane were removed by distillation in vacuo. The residual yellow liquid, on further distillation in vacuo, yielded n-tetradecyltriethoxysilane (226 g., 63%), B.P. 130/0.4 mm.

Found (percent): C, 66.4; H, 12.2; and Si, 7.3. C$_{20}$H$_{44}$O$_3$Si requires (percent): C, 66.7; H, 12.2; Si, 7.8.

$$CH_2=CH(CH_2)_{11}CH_3+HSi(OC_2H_5)_3 \rightarrow (C_2H_5O)_3Si(CH_2)_{13}CH_3$$

EXAMPLE 4

Undecylenic acid ethyl ester (33 g., 0.156 mole) and [RhCl(Ph$_3$P)$_3$] (88 mg., $6 \times 10^{-4}$ moles/mole) were dissolved in dry benzene (50 ml.) and triethoxysilane (35 g., 0.213 mole) was added slowly, with stirring at room temperature. The yellow-coloured solution was boiled under reflux for 12 hours after which benzene and triethoxysilane were removed by distillation. The residual yellow liquid, on distillation in vacuo, afforded 10-carbethoxy-n-decyltriethoxysilane (35 g. 58.5%), B.P. 160°/2.2 mm.

Found (percent): C, 60.6; H, 10.3; Si, 7.7. C$_{19}$H$_{40}$Si requires (percent): C, 60.6; H, 10.6; Si, 7.45.

$$CH_2=CH(CH_2)_8COOC_2H_5+HSi(OC_2H_5)_3 \rightarrow (C_2H_5O)_3Si(CH_2)_{10}COOC_2H_5$$

What is claimed is:

1. A process for the preparation of an organic silicon compound which comprises contacting a compound containing at least one silicon to hydrogen bond and where the remaining silicon valences in the compound containing at least one silicon to hydrogen bond is satisfied by a group selected from the group consisting of lower alkyl, cyclohexyl, lower alkenyl, phenyl or methyl substituted phenyl, dimethyl siloxy and lower alkoxy, with a compound selected from the group consisting of an acetylene and an olefin containing up to 20 carbon atoms, butadiene, selected vinyl and allyl acetate esters, vinyl ether, vinyl triethoxy silane and undecylenic acid ethyl ester in the presence of [RhCl(Ph$_3$P)$_3$].

2. The process of claim 1 in which the group is selected from the group consisting of methyl, ethyl, propyl, butyl, cyclohexyl, vinyl, allyl and phenyl groups.

3. The process of claim 1 in which the compound containing a silicon to hydrogen bond and the compound containing an acetylenic or olefinic bond is the same compound.

4. The process of claim 1 in which the concentration of the catalyst is $10^{-8}$ to $10^{-2}$ molar.

5. The process of claim 1 in which the temperature is ambient to 300° C.

6. The process of claim 1 in which the pressure is atmospheric pressure to 10 atmospheres.

7. The process of claim 1 in which an inert solvent is present.

References Cited

UNITED STATES PATENTS

| | | | |
|---|---|---|---|
| 3,198,766 | 8/1965 | Nitzsche et al. | 260—448.2XR |
| 3,231,594 | 1/1966 | Speier | 260—448.2 |
| 3,257,440 | 6/1966 | Jex | 260—448.2 |
| 3,296,291 | 1/1967 | Chalk et al. | 260—448.2 |

OTHER REFERENCES

Young, et al., Chemical Communications (1965), 131–132, Apr. 14, 1965.

TOBIAS E. LEVOW, Primary Examiner

P. F. SHAVER, Assistant Examiner

U.S. Cl. X.R.

260—448.8